(12) United States Patent
Phillips

(10) Patent No.: US 7,353,904 B2
(45) Date of Patent: Apr. 8, 2008

(54) STEERABLE PRIMARY AXLE

(75) Inventor: David Lawrence Phillips, Willow Springs, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/740,317

(22) Filed: Apr. 26, 2007

(65) Prior Publication Data

US 2007/0187168 A1    Aug. 16, 2007

Related U.S. Application Data

(62) Division of application No. 10/996,259, filed on Nov. 23, 2004, now Pat. No. 7,231,999.

(51) Int. Cl.
*B60K 17/14* (2006.01)

(52) U.S. Cl. ........................ 180/253; 180/308

(58) Field of Classification Search ........ 180/253–263, 180/6.48, 305, 308
See application file for complete search history.

(56) References Cited

U.S. PATENT DOCUMENTS

| | | | |
|---|---|---|---|
| 1,130,285 A | | 3/1915 | Honnold |
| 1,289,851 A | | 12/1918 | Marling |
| 3,469,648 A | * | 9/1969 | Cannon ................ 180/261 |
| 4,576,394 A | | 3/1986 | Van der Lely |
| 4,597,468 A | | 7/1986 | Friedrich |
| 4,798,260 A | | 1/1989 | Nakata et al. |
| 5,148,885 A | * | 9/1992 | Weyer ................ 180/253 |
| 5,203,169 A | | 4/1993 | Ishii et al. |
| 6,260,339 B1 | | 7/2001 | Abend et al. |
| 6,302,233 B1 | * | 10/2001 | Okamuro et al. ........... 180/253 |
| 6,312,354 B1 | | 11/2001 | Irikura et al. |
| 6,336,513 B1 | | 1/2002 | Hasegawa et al. |
| 6,571,894 B2 | | 6/2003 | Ishimaru et al. |
| 6,637,535 B2 | | 10/2003 | Nemoto |
| 6,745,864 B2 | | 6/2004 | Abend et al. |
| 6,755,264 B2 | | 6/2004 | Hasegawa et al. |
| 6,823,961 B2 | * | 11/2004 | Lamela et al. ............ 180/305 |
| 2004/0055267 A1 | | 3/2004 | Wright et al. |
| 2004/0124019 A1 | | 7/2004 | Harrup et al. |

FOREIGN PATENT DOCUMENTS

| | | |
|---|---|---|
| EP | 0 047 942 | 3/1982 |
| EP | 0 110 474 | 6/1984 |

* cited by examiner

*Primary Examiner*—Kevin Hurley

(57) ABSTRACT

A steerable primary axle for a fairway mower or other machine includes a pair of motors mounted in fixed positions on opposing ends of an axle. The mechanical drive system includes a pair of input shafts having input bevel gears, a pair of output shafts with output bevel gears and wheel mounts, and a pair of intermediate shafts between the input shafts and output shafts. Each intermediate shaft has an upper bevel gear meshed with the input bevel gear and a lower bevel gear meshed with the output bevel gear. The output shafts may be enclosed within pivotable housings. A pair of drag links are attached to the pivotable housings and to a steering linkage. The wheels on the wheel mounts may be steered without moving the motors, reducing or minimizing strain on hydraulic hoses or electric cables on the steered wheels.

8 Claims, 2 Drawing Sheets

STEERABLE PRIMARY AXLE

This is a divisional and claims priority of application Ser. No. 10/996,259 filed 23 Nov. 2004, now U.S. Pat. No. 7,231,999 that application incorporated by reference in its entirety in this present application.

FIELD OF THE INVENTION

This invention relates generally to drives for grass and vegetation cutting machines such as fairway mowers, and more specifically to drives for steerable axles on such machines.

BACKGROUND OF THE INVENTION

Grass and vegetation cutting machines used for golf course fairways and other applications that require high quality mowing are sometimes referred to as fairway mowers. Fairway mowers use a fixed front axle as the primary drive, and have a steerable rear axle. In other words, the "primary" axle is a driven or powered axle. The front wheels are hydraulically powered to help the machines turn and steer on soft, wet turf, without tearing it. Efforts to power fairway mowers mechanically using differentials and/or over-running clutches have had only limited success.

Optionally, the rear axle of a fairway mower also may be powered. For example, the rear axle may be powered by a hydraulic motor in an effort to improve traction of the machine. The hydraulic motors, both front and rear, are connected in parallel circuits. If any one wheel of the machine slips, then all hydraulic flow goes to the motor for that wheel, and the machine loses traction.

Adding a hydraulic motor to each of the steerable wheels of a fairway mower significantly increases the cost and complication of the machine. There is a need for a more economical and simple steerable primary axle on a fairway mower. There is a need for a steerable primary axle that can provide higher torque to the wheels without slipping. There is a need for a steerable primary axle that will minimize damage to the turf during steering. There is a need for a steerable primary axle that may be used as the front or rear axle of the machine. There is a need for smaller, lower cost motors for fairway mowers and similar machines.

Motors for driving the wheels of fairway mowers and similar machines are connected to hydraulic pumps by hoses that carry high pressure hydraulic fluid. If the driven wheel also is steered, the hydraulic motors, hoses, and hose connections must swing through an arc. The steering movement strains the hoses and hose connections. As a result, the hoses and hose connections may leak or wear prematurely. Similarly, fairway mowers or similar machines with electric wheel motors may strain the electric cables that must swing through an arc when steering. There is a need to reduce or minimize strain on hydraulic hoses or electric cables on steered drive wheels of fairway mowers and similar vehicles. There is a need to reduce leakage and premature wear of these hydraulic hoses and cables.

SUMMARY OF THE INVENTION

An economical and simplified steerable primary axle is provided for a fairway mower or other machine. The steerable primary axle can provide higher torque to the wheels without slipping, and can minimize turf damage when steering. The steerable primary axle may be used as the front or rear axle of the machine, and enables use of smaller, lower cost hydraulic or electric motors. The wheels may be steered without moving the motors, hydraulic hoses or electric cables connecting to the motors. Leakage and premature wear of the hydraulic hoses and cables may be reduced.

In one embodiment, the steerable primary axle includes a tubular axle cross member with a motor attached in a fixed position adjacent each end thereof. Each motor may be mounted to the inboard face of an end plate. A mechanical drive system may include an upper housing mounted to the outboard face of each end plate, and a lower housing connected to a steering linkage to pivot with respect to the upper housing without moving the hydraulic motor or hoses. The upper housing encloses an input shaft extending from the hydraulic motor, an intermediate shaft extends between the upper and lower housings, and an output shaft extends from the lower housing. An input bevel gear may be on the input shaft, an upper bevel gear and a lower bevel gear on the intermediate shaft, and an output bevel gear on the output shaft. For gear reduction between the motor and the output shaft, the input bevel gear may have a smaller diameter than the upper bevel gear, and/or the lower bevel gear may have a smaller diameter than the output bevel gear.

DESCRIPTION OF THE PREFERRED EMBODIMENT

Figure 1:
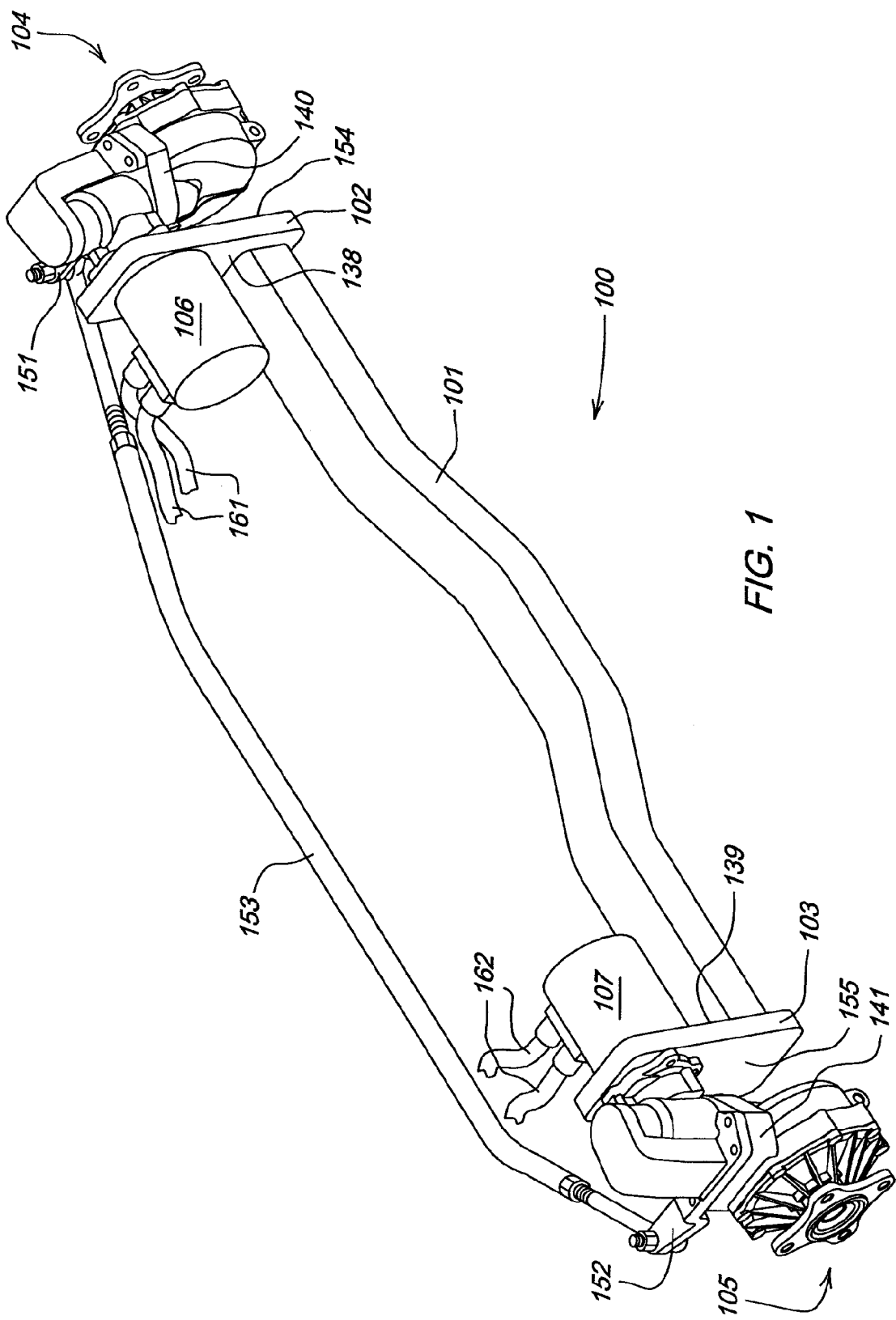
FIG. 1 is a perspective view of a steerable primary axle of a fairway mower according to a first embodiment of the invention.

In one embodiment of the invention shown in FIG. 1, steerable primary axle 100 may be provided on a fairway mower, or another machine used for grass or vegetation cutting, agricultural work, or grounds keeping. The steerable primary axle may include tubular axle cross member 101 that may be mounted to a suspension system adjacent the front or rear of the machine. The embodiment of the steerable primary axle shown in FIG. 1 may be used as either the front or rear axle. Additionally, the invention also may be used on a single steerable drive wheel.

In one embodiment, left and right plates 102, 103 may be welded or secured to the left and right ends of tubular axle cross member 101. Each plate may have a pair of opposing oblong metal surfaces positioned in generally vertical planes. Each plate may have an inboard face and an outboard face, and a thickness between the faces of between about 0.1 inches and about 1 inch. Each plate may be positioned in a generally vertical plane normal to the axis or center line of tubular axle cross member 101 and extending upwardly from the end of the tubular axle cross member.

In one embodiment, motors 106, 107 may be attached or mounted to the inboard faces 138, 139 of plates 102, 103. The motors may be positioned above the tubular axle cross member and parallel to the axle centerline. Motor 106 may drive the left wheel in forward or reverse, and motor 107 may drive the right wheel in forward or reverse. Motors 106, 107 may be hydraulic motors that are connected by hydraulic hoses 161, 162 to hydraulic pumps (not shown). Alternatively, motors 106, 107 may be electric motors connected by cables to a power supply.

In one embodiment, motors 106, 107 may be fastened in a fixed and stationary position to the inboard faces 138, 139 of the plates welded to the ends of the tubular axle cross member. When the machine is steered, each motor remains fixed, and does not pivot with the machine's steered wheels. As a result, when the wheels of the machine are steered, hydraulic hoses and/or cables connected to each motor remain fixed, and are not subjected to bending or stretching.

In one embodiment, each motor 106, 107 may independently power one of the left and right wheels in forward or reverse using mechanical drive systems 104, 105. Each mechanical drive system may be attached to an outboard face 154, 155 of a plate, and to the left or right wheel of the machine. In one embodiment, the mechanical drive system for each wheel may provide integral speed reduction capability by gear reduction and torque multiplication between the motor and the output wheel. The gear reduction and torque mutliplication may allow a physically smaller and less robust motor. Additionally, brakes also may be included in the motor.

Figure 2:
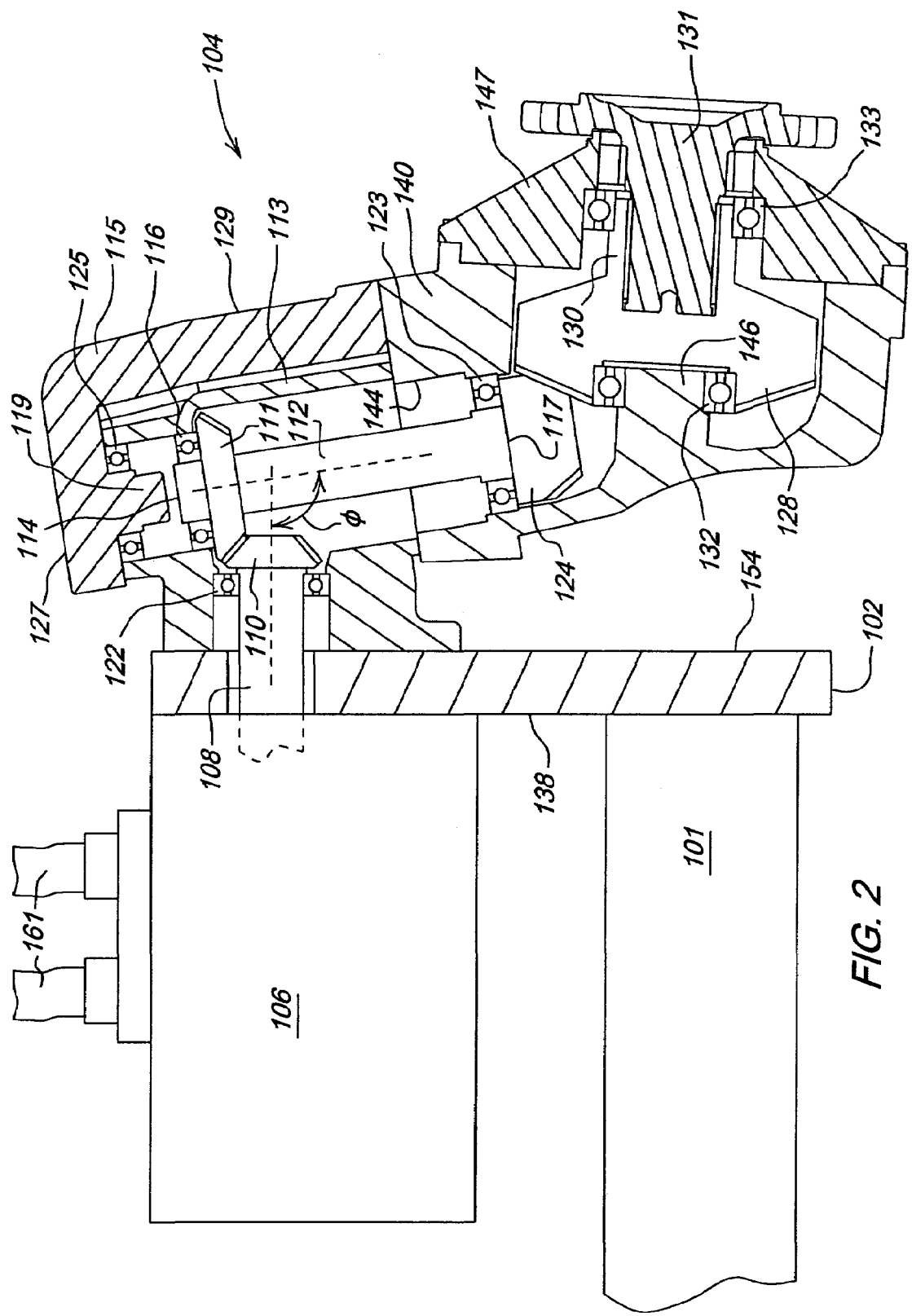
FIG. 2 is a perspective view of an embodiment of a mechanical drive system in the steerable primary axle of FIG. 1.

FIG. 2 shows detail of an embodiment of mechanical drive system 104 mounted on outboard face 154 of plate 102. If both wheels are driven and steered, the same or a substantially similar drive system also may be mounted on the outboard face of plate 103. Mechanical drive system 104 may include input shaft 108, intermediate shaft 112, and output shaft 130. The input shaft 108, intermediate shaft 112, and output shaft 130 may be arranged in a generally Z-shaped configuration.

In one embodiment, input shaft 108 may be generally horizontal and parallel to the axis or center line of tubular axle cross member 101. Input shaft 108 may be integral with motor 106, and may extend through plate 102. Intermediate shaft 112 may be vertical or at an angle $\phi$ of between about 90 degrees and about 120 degrees with respect to input shaft 108. Output shaft 130 may be generally horizontal and parallel to the axis or center line of tubular axle cross member 101. The output shaft may be connected to a flange or hub 131 for wheel mounting (not shown).

In one embodiment, the input shaft, intermediate shaft, and output shaft may have bevel gears attached thereto. For example, input shaft 108 may have bevel gear 110 attached to the outer end of the shaft. Intermediate shaft 112 may have upper bevel gear 111 attached near the upper end 114 of the shaft, and lower bevel gear 124 at the lower end 117 of the shaft. Output shaft 130 may have output bevel gear 128 attached thereto or integral therewith. To provide gear reduction and torque multiplication, for example, input bevel gear 110 on input shaft 108 may have a smaller diameter than upper and lower bevel gears 111, 124, and the upper and lower bevel gears may have smaller diameters than output bevel gear 128.

In one embodiment, the input shaft, intermediate shaft, and output shaft may be supported for rotation by low friction sleeves or bearings. Low friction sleeve or bearing 122 may support input shaft 108 for rotation adjacent the outer end of the shaft. Low friction sleeve or bearing 116 may support intermediate shaft 112 adjacent upper end 114, and sleeve or bearing 123 may support intermediate shaft 112 adjacent lower end 117. Low friction sleeve or bearing 132 may be mounted on projection 146 to support output bevel gear 128, and low friction sleeve or bearing 133 may support output shaft 130.

In one embodiment, drive system 104 may include a first, stationary or fixed, upper housing 113 and a separate second, pivotable, lower housing 140. The upper and lower housings may be pivotally attached to each other. The first, upper housing is fixed and the second, lower housing pivots to steer the wheel. For example, first or upper housing 113 may be fixed to plate 102 and remains stationary during steering. Intermediate shaft 112 may extend between the upper housing and the lower housing. The second or lower housing 140 may pivot a maximum of between about 90 degrees and about 180 degrees during steering. Lower housing may include removable end cover 147.

In one embodiment, pivoting only the second or lower housing allows motor 106 to remain in a fixed position relative to the axle centerline. Hose or cable connections 161 to motor 106 may remain in essentially fixed positions relative to the vehicle chassis. Similarly, hose or cable connections 162 to motor 197 may remain essential fixed during steering. The hoses or cables do not need to swing through the steering arc, and thus may be more compact and durable.

In one embodiment, as shown in FIG. 1, each second or lower housing 140, 141 may be connected to a drag link 151, 152. The drag links may be connected to each other by tie rod 153. The drag links also may be connected to a steering linkage (not shown) which may link to steering controls in the vehicle operator station of the fairway mower or other machine.

In one embodiment, as shown in FIG. 2, lower housing 140 may be supported for pivoting by upper pivot support 115 and lower collar 144. Upper pivot support 115 may be a generally inverted L-shaped member. For example, the upper pivot support may include lower leg 129, and upper leg 127 having projection 119 extending into low friction sleeve or bearing 125 in upper housing 113. Lower collar 144 may be integral with lower housing 140 and may be mounted for rotation around low friction sleeve or bearing 123.

The invention provides a more economical and simple steerable primary axle for a fairway mower or other machine. The steerable primary axle can provide higher torque to the wheels without slipping, and minimizes damage to the turf during steering. The steerable primary axle may be used as the front or rear axle, and enables use of smaller, lower cost motors for fairway mowers and other machines. Because the wheels may be steered without moving the motors, the steerable primary axle reduces or minimizes strain on hydraulic hoses or electric cables on the steered wheels. As a result, leakage and premature wear of these hydraulic hoses and cables may be reduced.

Having described a preferred embodiment, it will become apparent that various modifications can be made without departing from the scope of the invention as defined in the accompanying claims.

The invention claimed is:

1. An apparatus comprising:
   a motor mounted in a fixed position and having an input shaft extending therefrom that rotates in forward or reverse; the input shaft having an input bevel gear on an end of the shaft;
   an intermediate shaft having an upper bevel gear on an upper end of the shaft and a lower bevel gear on a lower end of the shaft; the input bevel gear engaging the upper bevel gear; and
   an output shaft having an output bevel gear on one end of the shaft and a wheel on another end of the shaft; the lower bevel gear engaging the output bevel gear; the output shaft pivotable with respect to the motor to steer the wheel.

2. The apparatus of claim 1 further comprising a tubular axle member having a first end and a second end; the motor mounted in a fixed position at an end of the tubular axle member.

3. The apparatus of claim 2 wherein the tubular axle member has a first end plate attached to the first end and a second end plate attached to the second end.

4. The apparatus of claim 3 further comprising a pair of motors, each motor mounted in a fixed position on an end plate.

5. The apparatus of clam 1 wherein the motor is hydraulic.

6. The apparatus of claim 1 wherein the motor is electric.

7. The apparatus of claim 1 wherein there is a gear reduction between the input bevel gear and the output bevel gear.

8. The apparatus of claim 1 further comprising a first housing and a second housing, the second housing enclosing the output bevel gear and being pivotable with respect to the first housing.

* * * * *